(12) United States Patent
Jayaraman et al.

(10) Patent No.: US 7,158,797 B1
(45) Date of Patent: Jan. 2, 2007

(54) MOBILE INFORMATION ACQUISITION SYSTEM

(75) Inventors: Vinod Jayaraman, San Francisco, CA (US); Hitoshi Takanashi, Fremont, CA (US)

(73) Assignee: NTT Multimedia Communications Laboratories, Inc., Palo Alto, CA (US)

( * ) Notice: Subject to any disclaimer, the term of this patent is extended or adjusted under 35 U.S.C. 154(b) by 1043 days.

(21) Appl. No.: 09/687,657

(22) Filed: Oct. 13, 2000

(51) Int. Cl.
*H04Q 7/20* (2006.01)

(52) U.S. Cl. ............... 455/456.1; 455/456.2; 455/456.3; 455/414.2; 455/457

(58) Field of Classification Search ........... 455/456.1, 455/456.2, 414, 457, 414.2, 456.3; 342/357.01, 342/357.08, 357.09
See application file for complete search history.

(56) References Cited

U.S. PATENT DOCUMENTS

| 6,456,854 B1 * | 9/2002 | Chern et al. ............ 455/457 |
| 6,697,630 B1 * | 2/2004 | Corwith ................. 455/457 |

\* cited by examiner

*Primary Examiner*—Matthew D. Anderson
*Assistant Examiner*—Eugene Yun
(74) *Attorney, Agent, or Firm*—Trop, Pruner & Hu, P.C.

(57) ABSTRACT

A system includes a mobile unit, a client and a remote server. The mobile unit is adapted to acquire information about a region near the mobile unit, determine a location of the mobile unit and transmit an indication of the information and location. The remote server is adapted to communicate with the mobile unit to receive the indication from the mobile unit and communicate at least some of the information to the client.

48 Claims, 8 Drawing Sheets

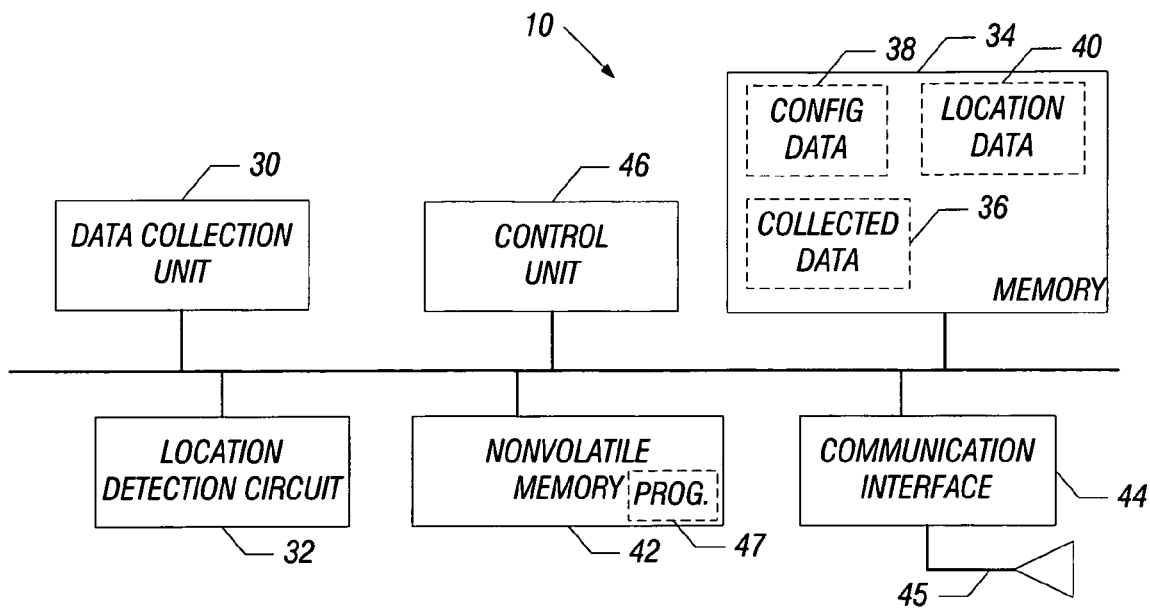
FIG. 2
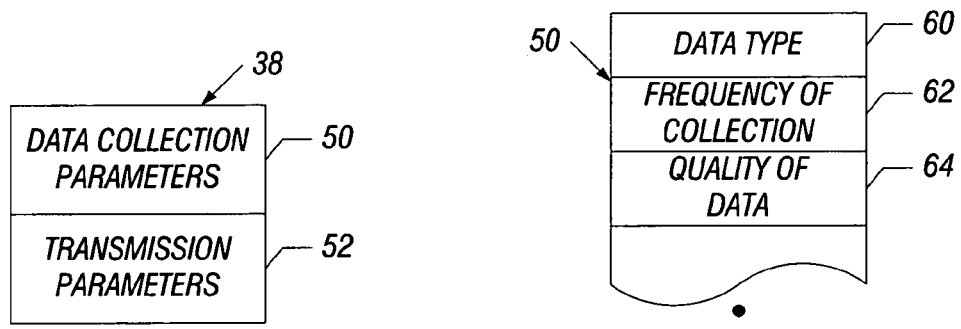
FIG. 3
FIG. 4

MOBILE INFORMATION ACQUISITION SYSTEM

BACKGROUND

The invention generally relates to a mobile information acquisition system.

Cameras, microphones and other information gathering devices typically are used in an information acquisition system for purposes of remotely monitoring a particular scene. For example, one such type of system is an information acquisition system is a security monitoring system that typically includes cameras that are strategically mounted to view entry points and hallways of a building. Thus, each camera typically has a fixed position and is associated with a particular scene of interest.

As another example, information gathering devices may be mounted at fixed positions along a highway to monitor traffic conditions at predefined locations of the highway. Therefore, each information gathering device is associated with a particular point of the highway.

Unfortunately, the above-described information acquisition systems may furnish information about specific stationary locations. Therefore, using the above-described traffic monitoring system as an example, information about traffic conditions at points other than the predefined locations may not be obtained.

Thus, there is a continuing need for an arrangement that addresses one or more of the problems that are stated above.

SUMMARY

In an embodiment of the invention, a system includes a mobile unit, a client and a remote server. The mobile unit is adapted to acquire information about a region near the mobile unit, determine a location of the mobile unit and transmit an indication of the information and location. The remote server is adapted to communicate with the mobile unit to receive the indication from the mobile unit and communicate at least some of the information to the client.

Other features and advantages of the invention will become apparent from the following description drawing and claims.

BRIEF DESCRIPTION OF THE DRAWING

FIG. 2 is a schematic diagram of a mobile field unit of the system of FIG. 1 according to an embodiment of the invention.

FIG. 3 is an illustration of configuration data according to an embodiment of the invention.

FIG. 4 is an illustration of data collection parameters of the configuration data of FIG. 3 according to an embodiment of the invention.

DETAILED DESCRIPTION

Figure 1:
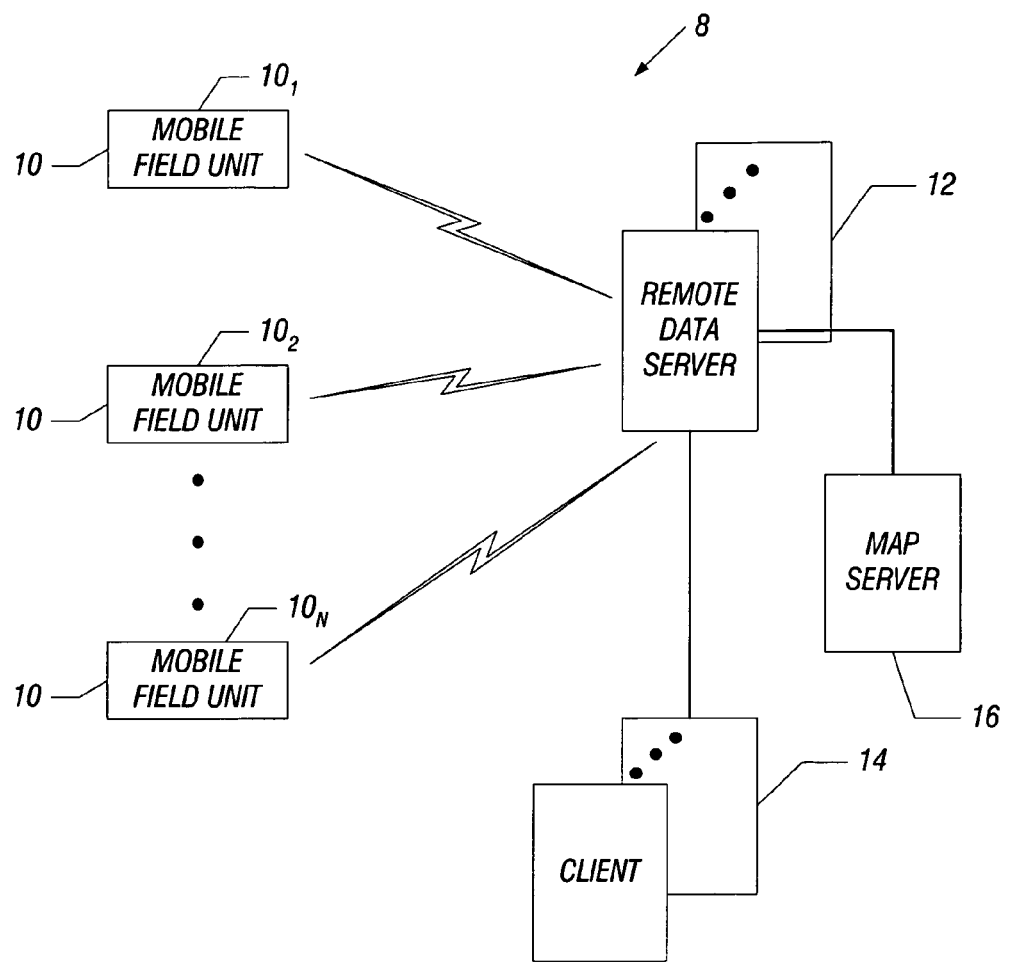
FIG. 1 is a schematic diagram of a mobile information acquisition system according to an embodiment of the invention.

Referring to FIG. 1, an embodiment 8 of a mobile acquisition system in accordance with the invention includes mobile field units 10 (mobile field units $10_1$, $10_2$, . . . $10_N$, shown as examples), each of which may collect, or acquire, information in the form of data (audio and video data, as examples) that indicates one or more characteristics of the surroundings of the mobile field unit 10. As its name implies, the mobile field unit 10 is mobile due to its attachment to a mobile object, such as a car, a truck or a commuter train, as just a few examples. Thus, due to its mobility, the location of the mobile field unit 10 may change as the mobile field unit 10 is acquiring data. However, the mobile field unit 10 accommodates its movement by labeling, or "stamping," the acquired data with the location where the data was acquired. As examples, the acquired data may indicate such characteristics as pictures, sounds, text, weather conditions, brightness levels and/or noise levels, as just a few examples.

As described below, each mobile field unit 10 may transmit (either asynchronously or synchronously) the acquired data and the associated location data via a wireless network (as an example) to a remote data server 12. The system 8 may include more than one remote data server 12 or may just include a single remote data server 12. Regardless of the number of remote data server(s) 12, the remote data server(s) 12 collectively maintain a database of the acquisition data and the location specific data that are furnished by the mobile field units 10. In the description herein, it is implied that when a remote data server 12 retrieves, processes or filters stored data in the database, the remote data server 12 may interact with at least one other remote data server 12 that helps maintain the database.

Thus, the remote data server(s) 12 store the acquisition and location specific data from the various mobile field units 10. Clients 14 may access this data by communicating with one of the remote data servers 12. In this manner, one of the clients 14 may access one of the remote data servers 12 to receive specific acquisition data. As an example, the remote data server 12 that is contacted by the client 14 may be an Internet web server. More specifically, clients 14 may be presented with a map showing the location of various mobile field units. A client 14 may then select a particular mobile field unit or a particular location on the displayed map, and may also specify additional filter parameters. In response to the choices made by the requesting client 14 the data server 12 then presents the client 14 with the information associated with the selected location and the specified filter parameters.

For example, the client 14 may submit a request (to a remote data server 12) that includes filter parameters that identify a particular mobile field unit 10. In response to this request, the remote data server 12 communicates the stored acquisition and location data that are associated with the identified mobile field unit to the client 14. The filer parameters may further specify a time range, a date range or other filter parameters to more specifically select the data that is furnished by the remote data server 12. As another example, a particular client 14 may communicate a request for the remote data server 12 to communicate the most recent information and location data that has been received from a particular mobile field unit 10. Other filter parameters may specify other filtering criteria, such as a time range in which the data was acquired; a date range in which the data was acquired; or a particular position, or geographical location. The filter parameters may also specify moving information, such as a direction and/or a speed. Other filter parameters are possible.

Thus, as another example, a request from the client 14 may not specify a particular mobile field unit 10, but instead, the request may specify a geographical location, such as a street address, for example. In this manner, in response to this request, the remote data server 12 determines the particular mobile field unit 10 that is closest to the specified location. To aid the remote data server 12 in determining which mobile field unit 10 is closest to the specified location, the remote data server 12 may communicate with a map server 16, as described below.

Referring to FIG. 2, in some embodiments of the invention, the mobile field unit 10 may include a computer that includes a data collection unit 30 for collecting information about one or more characteristics of a region near the mobile field unit 10 and a location detection circuit 32 (a global positioning system (GPS) receiver, for example) for determining the location of the mobile field unit 10. The data collection unit 30 may include a camera, microphone and/or other type of sensor devices that are coupled to the computer to provide some sort of data about the region surrounding the mobile field unit 10. In some embodiments of the invention, the mobile field unit 10 may include a communication interface 44 and an antenna 45 to communicate with the remote data server(s) 12 as part of a wireless network.

The mobile unit 10 may communicate the acquisition and location specific data to a remote data server 12 synchronously, or in real time, as the data is being acquired. However, the mobile field unit 10 may work in an offline mode in which the mobile field unit 10 acquires data and transmits later. In this manner, when working in an offline mode, the mobile unit 10 transfers the data to a remote data server 12 asynchronously when network connectivity is available.

As described below, the mobile field unit 10 includes a memory 34 (a random access memory (RAM), for example) that stores configuration data 38 (described below); location data 40 that is generated by the location detection unit 32 and stored in the memory 34; and collected data 36 that is generated by the data collection unit 30 and stored in the memory 34. The mobile field unit 10 may also include a non-volatile memory 42, such as a hard drive or an electrically erasable programmable read only memory (EEPROM) (as just a few examples), that stores a program 47 to direct the activities of the mobile field unit 10 when executed. In this manner, the mobile field unit 10 may include a control unit 46 (a microprocessor, for example) that executes the program 47 to cause the mobile field unit 10 to perform the activities that are described herein. The program 47 may refer generally to a collection of subroutines or modules that are executed by the control unit 46 to cause the control unit 46 to perform routines, some of which are described below. The data collection unit 30, the control unit 46, the memory 34, the memory 42, the location detection circuit 32 and the communication interface 44 are all coupled together via one or more busses 31.

At bootup, or startup of the mobile field unit 10, the field unit 10 loads configuration data 38 that is depicted in more detail in FIG. 3. The configuration data 38 includes data collection parameters 50 and transmission parameters 52. As depicted in FIG. 4, the data collection parameters 50 include one of more parameter(s) 60 that indicate the type of data to be collected, one or more parameter(s) 62 that indicate a frequency at the data is collected and one or more parameter(s) 64 that indicate the quality of the data, as just a few examples. The quality of the data refers to, as examples, the resolution of video images or a sampling rate for audio data. The data collection parameters 50 may also indicate whether the mobile field unit 10 is in a manual acquisition mode in which data is acquired only when manually instructed by an operator of the mobile field unit 10 or whether the mobile field unit 10 is an automatic acquisition mode in which the mobile field unit 10 automatically acquires data.

Figure 5:
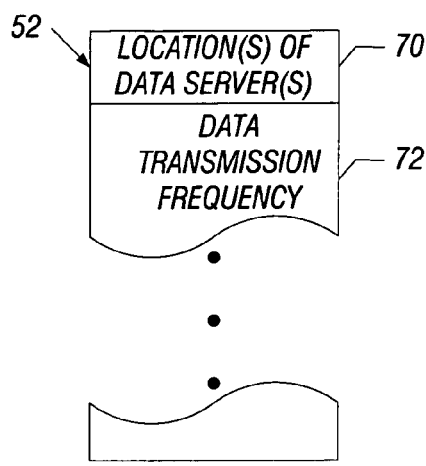
FIG. 5 is an illustration of transmission parameters of the configuration data of FIG. 3 according to an embodiment of the invention.

As depicted in FIG. 5, the transmission parameters 52 include one or more parameters 70 that indicate the addresses, or locations, of the remote data server(s) 12 and one or more parameters 72 that indicate a data transmission rhythm or frequency. As an example, the parameters 72 may indicate whether the mobile unit 10 is transmitted in a synchronous, or real-time mode, or transmitting asynchronously, as described further below.

Figure 8:
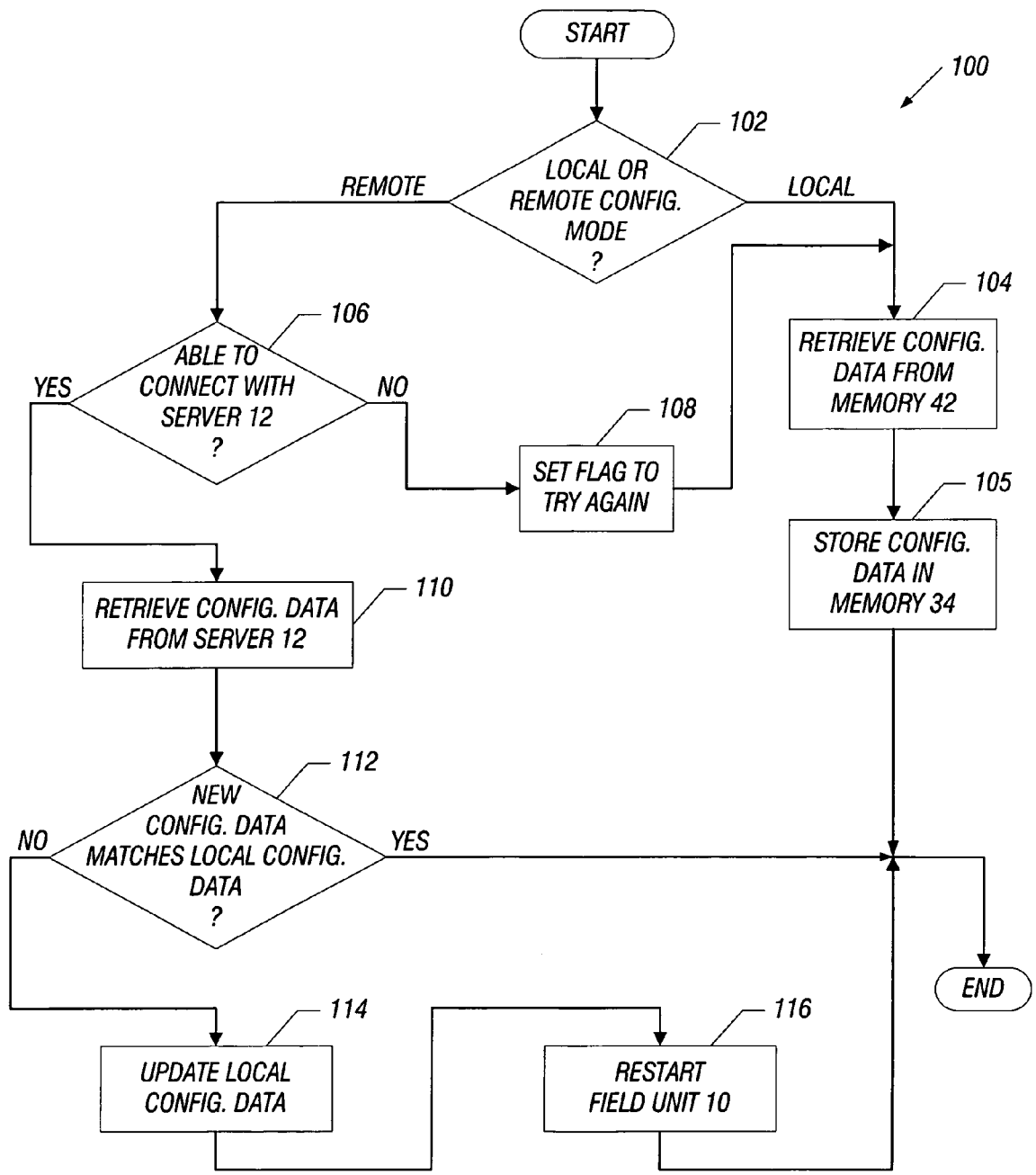
FIG. 8 is a flow diagram of a routine executed by the mobile field unit to load configuration data according to an embodiment of the invention.

Referring to FIG. 8, in some embodiments of the invention, the control unit 46 executes the program 47 to perform a startup routine 100 to load the configuration data 38. In the performance of the routine 100, the control unit 46 first determines (diamond 102) whether the mobile field unit 10 is in a local or a remote configuration mode. For the local configuration mode, the configuration data 38 is stored locally (initially stored in the non-volatile memory 42, for example) and can be modified locally by the control unit 46. For remote configuration, the control unit 46 uses the communication interface 44 to query a predetermined remote data server 12 for the configuration data 38.

More specifically, if the control unit 46 determines (diamond 102) that the mobile field unit 10 is in the local configuration mode, then the control unit 46 retrieves (block 104) a copy of the configuration data 38 from the non-volatile memory 42 and stores (block 105) the configuration data 38 in the memory 34. Otherwise, if the control unit 46 determines (diamond 102) that the mobile field unit 10 is in the remote configuration mode, then the control unit 46 attempts to communicate with the predetermined remote data server 12 (via the communication interface 44 (see FIG. 2)) and determine (diamond 106) whether the mobile field unit 10 is able to connect to the predetermined remote data server 12. If the mobile field unit 10 cannot connect to the predetermined remote server 12, then the control unit 46 sets (block 108) a flag that indicates the failed attempt to connect and thus, indicates the need to try again. After the failed connection to the predetermined remote data server 12, the control unit 46 then proceeds to block 104 to locally retrieve the configuration data 38 until the predetermined remote data server 12 can be accessed to retrieve the configuration data 38.

If the control unit 46 can connect to the predetermined remote data server 12, then the control unit 26 retrieves (block 110) a copy of the configuration data 38 from the predetermined remote data server 12. Next, the control unit 46 determines (diamond 112) whether the new configuration data matches the local configuration data 38 that is stored in the non-volatile memory 42. If not, the control unit 46 updates (block 114) the local configuration data before restarting the mobile field unit 10, as depicted in block 116.

In some embodiments of the invention, the mobile field unit 10 may have the ability to upload its configuration data 38 to the predetermined data server 12 and receive messages to reload its configuration data 38 from the server 12. Other arrangements are possible.

Figure 9:
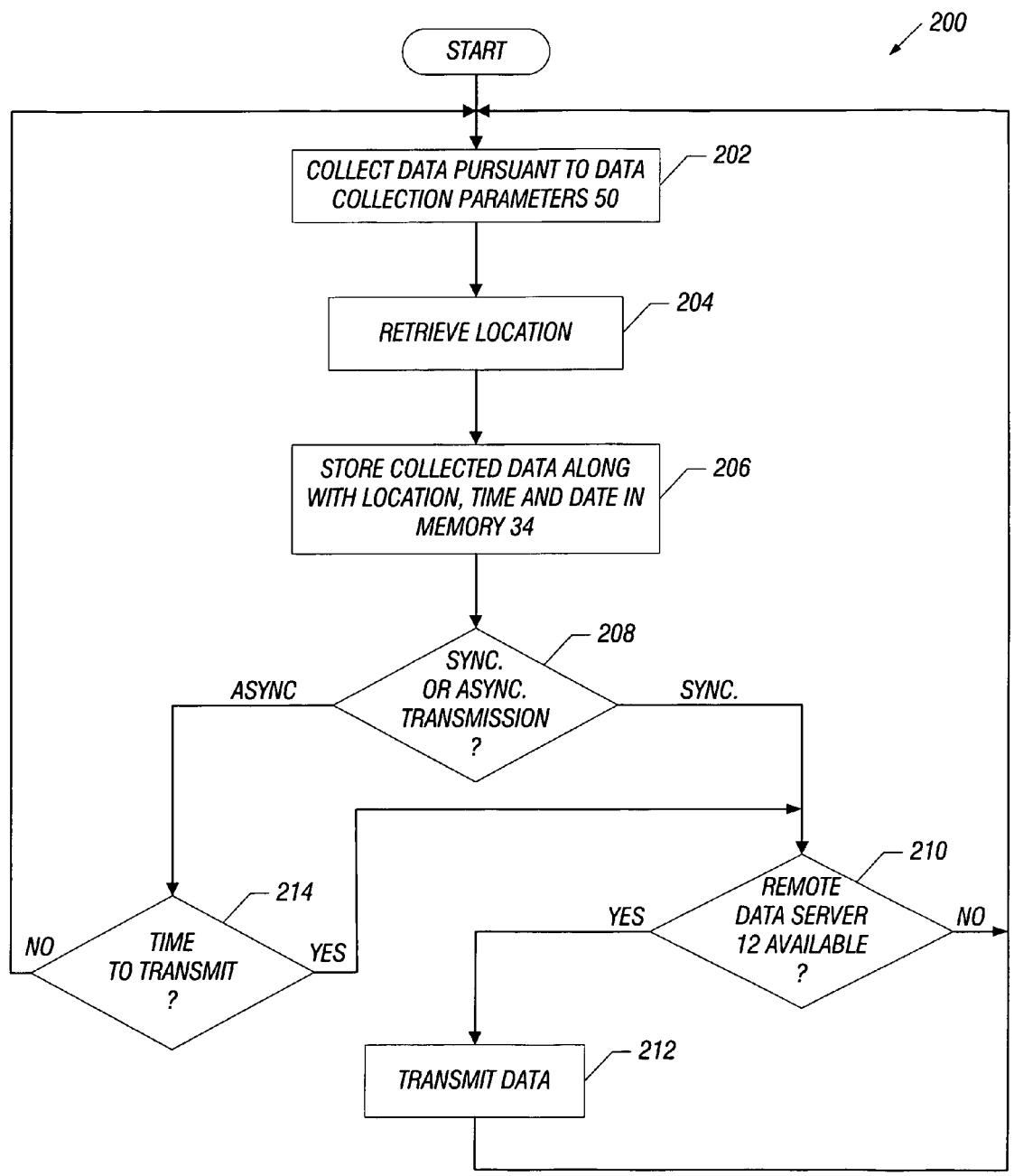
FIG. 9 is a flow diagram of a routine executed by the mobile field unit to acquire data and transmit acquired data according to an embodiment of the invention.

Referring to FIG. 9, in some embodiments of the invention, the control unit 46 may execute the program 47 to cause the control unit 46 to perform a routine 200 to acquire data (from the data collection unit 30) and transmit the acquired data to an available remote data server 12. In this manner, the control unit 46 interacts with the data collection unit 30 to cause the data collection unit 30 to acquire, or collect (block 202), data pursuant to the data collection parameters 50. The acquisition of data may be automatic and pursuant to a set schedule, or alternatively, the acquisition may be in response to a manual request. When each new set of data is collected, the control unit 46 interacts with the location detection circuit 32 to retrieve (block 204) the location of the mobile field unit 10. As an example, the location detection circuit 32 may be a navigational device like a GPS receiver, for example. Alternatively, if a cellular network is used to communicate with the remote data servers 12, then the control unit 46 may use the location of the mobile field unit 10 through triangulation by knowing the cellular base station locations. Therefore, in these embodiments of the invention, the control unit 46 may not use a location detection circuit.

Regardless of the technique that is used to determine the position of the mobile field unit 10, the control unit 46 stores (block 206) the collected data, an indication of the location of the mobile field unit 10, an indication of the time the data was acquired and an indication of the date that the data was acquired in the memory 34. The data transfer from the mobile field unit 10 to one of the remote data servers 12 can take place while the data is being collected (i.e., in real time, or synchronously), or the data may be transferred asynchronously at another time.

Therefore, after acquiring the data (via the data collection unit 30) and the location of the mobile field unit 10, the control unit 46 determines (diamond 208) whether the mobile field unit 10 is in a synchronous transmission mode or in an asynchronous transmission mode. In some embodiments of the invention, this mode is indicated by the transmission parameters 52. If in the synchronous transmission mode, the control unit 46 determines (diamond 210) if transmission to a remote data server 12 is unavailable. If available, then control unit uses the communication interface 44 to transmit (block 212) acquired data and the indications of the location, time and date to the remote data server 12. Otherwise, if transmission to a remote data server 12 is unavailable, the control unit 46 returns to block 202 to acquire more data so that transmission of the accumulated data may be attempted again. If the transmission is interrupted, or broken off, then the control unit 46 resumes communication with the remote data server 12 at a point where the communication was interrupted.

If the mobile field unit 10 is an asynchronous transmission mode, then the control unit 46 determines (diamond 214) whether it is time to transmit to a remote data server 12 based upon the transmission parameters 52 of the configuration data 38. In this manner, in determining if it is an appropriate time to transmit, the control unit 46 10 may determine whether a current time corresponds to a scheduled transmit time, whether the current corresponds to a time in a timeout interval or whether a sufficient amount of data has been acquired, as just a few examples.

If it is time to transmit, the control unit 46 transitions to diamond 210 to proceed as described above. When transferred asynchronously, data transfer may be based on a set time schedule, number of data sets collected, condition of the network, or the amount of data collected, as just a few examples. Under any scheme, if the remote data server 12 is inaccessible, then the mobile field unit 10 periodically tries to access a remote data server 12. Thus, when the remote data server 12 is available, data is then transferred.

The size and quality of data that is transmitted from a particular mobile field unit 10 may depend on parameters such as a wireless channel quality (signal-to-noise ratio and/or a signal-to-interference ratio, as examples), traffic conditions, a wireless channel bit rate and/or a subscriber fee, as just a few examples.

Figure 6:
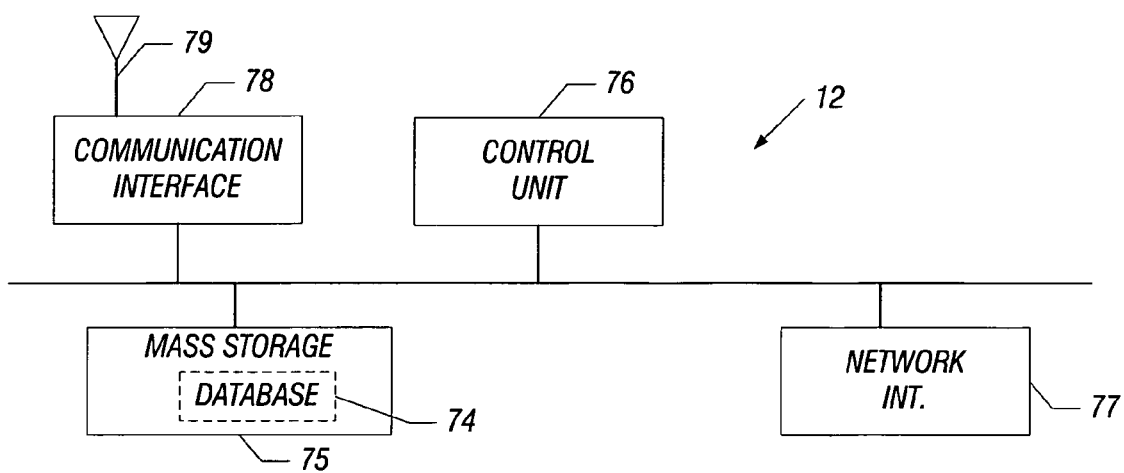
FIG. 6 is a schematic diagram of a remote data server according to an embodiment of the invention.

Referring to FIG. 6, in some embodiments of the invention, the remote data server 12 includes mass storage 75 (an array of hard drives, for example) that stores a database 74 of the information that is communicated from the mobile units 10. Alternatively, the database 74 may be collectively maintained by more than one remote data server 12. Besides the mass storage 75, the remote data server 12 may include a control unit (a microprocessor, for example), a wireless communication interface 78 to communicate with the mobile field units 10 and a network interface 77 to communicate with the map server 16 (see FIG. 1), other remote data server(s) and the clients 14. The control unit 76, communication interface 78, mass storage 75 and network interface 77 are all coupled together via one or more busses. The control unit 76 coordinates such activities as receiving the data from the mobile field units 10; organizing and storing the data in the database 74; and transmitting data to a particular client 14 based on the filters that are communicated from the client 14 to the remote data server 12. The control unit 76 may also use the network interface 77 to communicate with the map server 16 for purposes of determining the best choice for which mobile field unit 10 is supplying or has supplied the data to fulfill a particular request.

Figure 7:
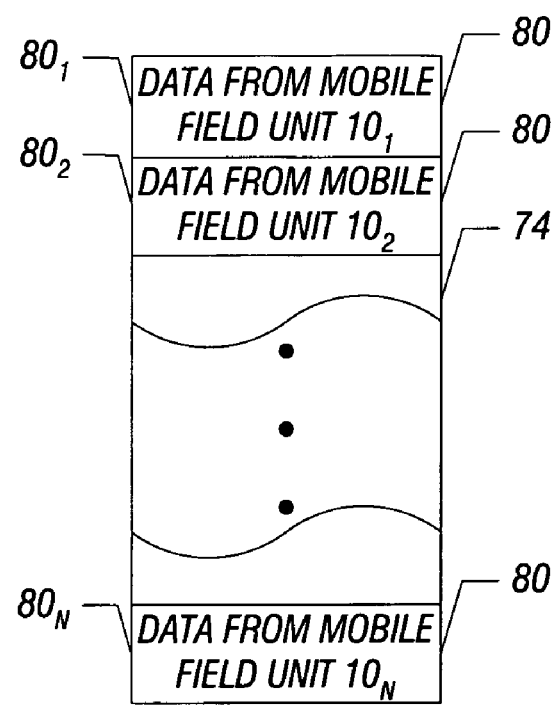
FIG. 7 is a schematic diagram of a data stored by the remote data server according to an embodiment of the invention.

In this manner, once the control unit 76 determines which mobile field unit 10 is to be used to fulfill a particular request, the control unit 76 retrieves the associated data from the database 74. Referring to FIG. 7, in some embodiments of the invention, the database 74 is organized into data subsets 80 (data subsets $80_1$, $80_2$, . . . $80_N$ shown as examples), each of which is associated with a particular mobile field unit 10 and includes the acquired data, location data, time data and date data for the associated mobile field unit 10. For example, the subset $80_1$ may be associated with the mobile field unit $10_1$ and include time-stamped and date-stamped data that the mobile field unit $10_1$ has collected at different locations. Therefore, if the control unit 76 decides to select data that is acquired by the mobile field unit $10_1$ to fulfill a particular client 14 request, the control unit 76 may select portions of the data subset $80_1$, which are within a specific time range, date range or location range, as specified by the client's request. In some embodiments of the invention, each subset 80 may include only the most recent acquisition and location specific information for its associated mobile field unit 10.

Figure 10:
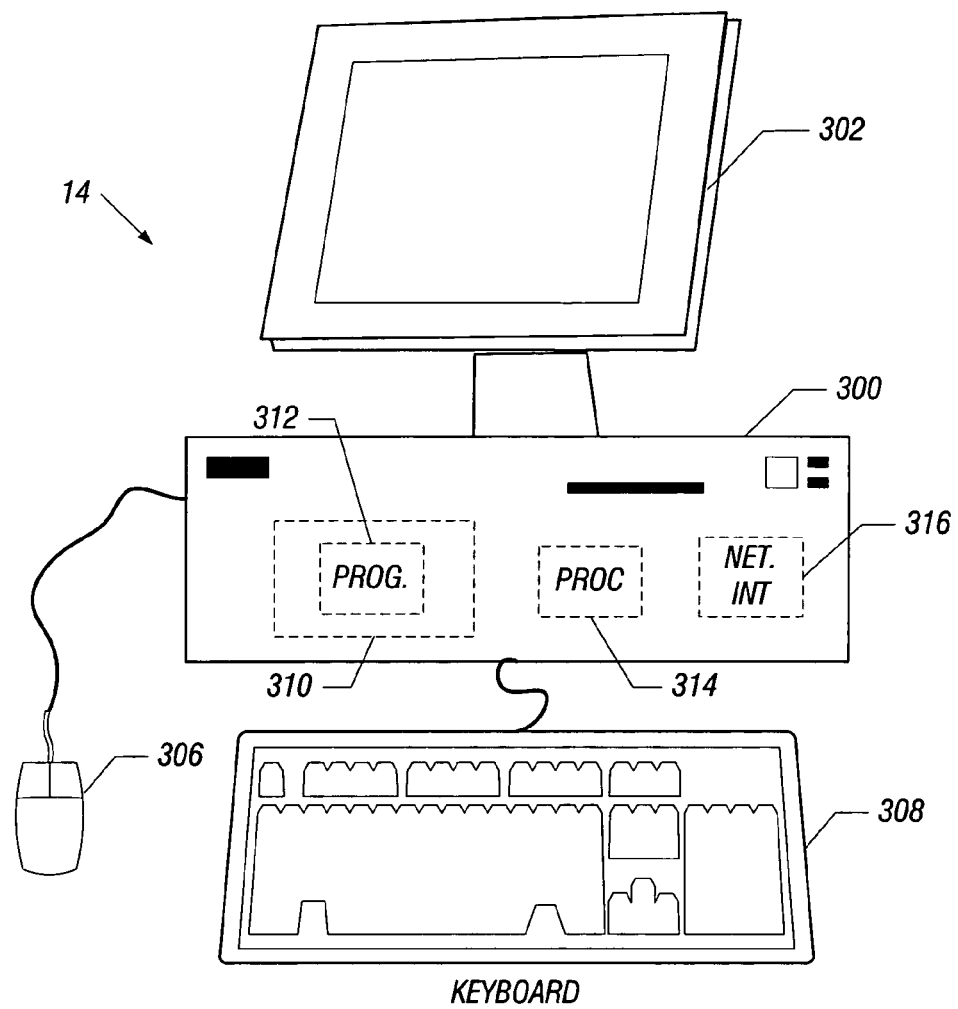
FIG. 10 is a schematic diagram of a client of FIG. 1 according to an embodiment of the invention.
Figure 11:
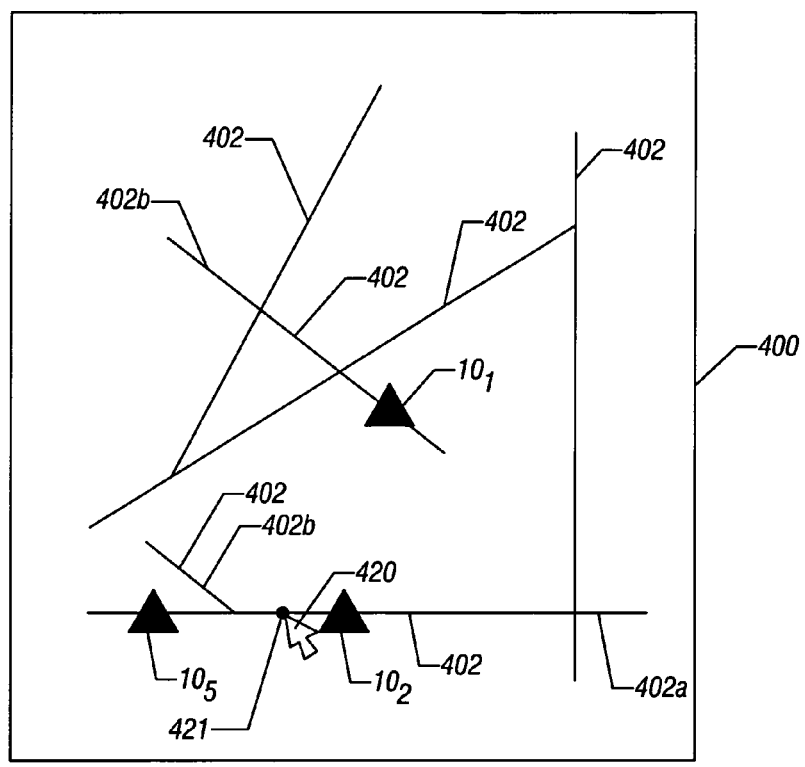
FIG. 11 is an illustration of a map displayed by the client according to an embodiment of the invention.

As a more specific example, an exemplary client 14 is depicted in FIG. 10. The client 14 includes a base unit 300 and a monitor 302. The base unit 300 may include, as examples, a microprocessor 314 and a network interface 316. The processor 314 may execute a program 312 that displays a map 400 (see FIG. 11) on a display 302 of the client 14. As an example, the program 312 may be stored in a memory 310 of the client 14 during execution. Alternatively, the remote data server 12 may send image data (to the client 14) that indicates the map 400 so that the client 14 may display the map 400. For example, the remote data server 12 may be an Internet server that communicates a frame of image data (to the client 14) that the client 14 uses to display the map 400.

The map 400 displays paths 402 (roads, for example) over which the mobile field units 10 may travel. As an example, the mobile field units $10_2$ and $10_5$ are depicted as traveling along paths 402a, and the mobile field unit $10_1$ is depicted as traveling along path 402b. The mobile field units 10 may or may not be visible on the map 400, depicting on the particular embodiment. Nevertheless, a user of the client 14 may use an input device (a keyboard 308 or a mouse 306, as examples) to indicate (via pointing with a cursor 421 and "clicking" of the mouse 306, for example) that information is desired near a point 421 along the path 402a. The client 14 communicates this indication of the desired location to the remote data server 12, and in response to this indication, the remote data server 12 may, for example, communicate data that was recently acquired or is being acquired by the mobile field unit $10_2$, i.e., the closest mobile field unit 10 to the point 421. Alternatively, the mobile field unit $10_2$ may have not yet passed by the point 421, and thus, the remote data server 12 may communicate the data that was mostly acquired at the point 421, such as data that was acquired by the mobile field unit $10_5$ that may not currently being traveling toward the point 421 and may be farther away from the point 421 than the mobile field unit $10_2$. Other filter parameters and selection criteria may be used for purposes of selecting the acquisition data from a particular mobile field unit 10.

In some embodiments of the invention, the size of each displayed mobile field unit 10 may depend on the accuracy of the location detection unit of the particular mobile field unit 10. Furthermore, in some embodiments of the invention, a color and possibly a size of each mobile field unit 10 that is displayed on the map depends on an age of the last information that was communicated from the mobile field unit 10.

The remote data acquisition system 8 may be used in several scenarios. For example, the system 8 may be used as a surveillance system. In this manner, the data collection unit 30 includes a camera that is attached to the mobile field unit 10. Still pictures or small video clips can be taken with the camera. It may be used to track people, monitor vehicle contents or to show traffic and weather conditions.

The system 8 may also be used by the police. In this manner, the mobile field unit 10 may be mounted to a police vehicle so that the vehicle location may be transmitted every few minutes (for example) to the police dispatch unit. This allows a dispatcher to track and dispatch officers more efficiently. When an officer stops a vehicle, the mobile field unit 0 may transmit acquired video and audio data to a center server (i.e., a remote data server 12) for storage, and the center server may communicate the data to a client that the dispatcher uses for surveillance of the traffic stop.

As another example, the system 8 may be used in connection with delivery trucks. In this manner, a camera and possibly a microphone (i.e., both part of the data collection unit 30) may be mounted in the cargo compartment of a delivery truck to monitor its contents. The mobile field unit 10 may then send location data to a remote data server 12 when the truck is moving. When there is activity in the cargo compartment, video, sound and/or images may be sent to a remote data server 12 along with the location of the truck. Thus, the cargo in the truck may be remotely monitored.

When used with a taxi, a camera (of the mobile field unit 10) may be mounted in the front of the taxi and point at the occupants of the vehicle. In this manner, the mobile field unit 10 transmits its data to be sent to a remote data server 12 for data storage and to the dispatcher (at the client 14) for surveillance. This arrangement permits the dispatcher to remotely monitor the taxi driver for security. If the driver is attacked and robbed the dispatcher can call the police and route them to the scene. The location data can be sent to the dispatcher to pinpoint the location of the taxi and aid in routing taxis to waiting costumers.

The system 8 may also be used to provide the public with information about public commuter systems. For example, the system can show video clips or pictures of the interior of a public commuter vehicle (a train, for example) to show a level of occupancy of the vehicle.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A system comprising:
    a mobile unit to:
        acquire information about a region near the mobile unit other than a location of the mobile unit,
        determine the location of the mobile unit,
        automatically label the information with the location of the mobile unit; and
        transmit an indication of the information and location;
    a client; and
    a remote server to communicate with the mobile unit to receive the indication from the mobile unit and communicate at least some of the information to the client.

2. The system of claim 1, wherein the client furnishes a request to the remote server for specific criteria and the remote server filters the information based on the specific criteria before communicating said at least some of the information to the client.

3. The system of claim 2, wherein criteria comprises one selected from a set consisting essentially of a time, a date, a position and an identifier identifying the mobile unit.

4. The system of claim 1, wherein the mobile unit comprises a global positioning system receiver to determine the location of the mobile unit.

5. The system of claim 1, wherein the mobile unit determines the location by using a triangulation technique based on locations of the cellular networks base stations.

6. The system of claim 1, wherein the mobile unit acquires the information automatically pursuant to a set schedule.

7. The system of claim 1, wherein the mobile unit acquires the information in response to a manual request.

8. The system of claim 1, wherein the information comprises at least one of a picture, a sound, text, a weather condition, a brightness level and a noise level.

9. The system of claim 1, wherein the information comprises location specific information.

10. The system of claim 1, wherein the indication is communicated to the remote server via a wireless network.

11. The system of claim 1, wherein the remote server communicates with the client via a wired network.

12. The system of claim 1, wherein the mobile unit comprises:
    a memory storing configuration data.

13. The system of claim 12, wherein the configuration data includes parameters that regulate the acquisition of data by the mobile unit.

14. The system of claim 13, wherein the parameters regulate at least one of a nature of data acquisition and a frequency of data acquisition by the mobile unit.

15. The system of claim 12, wherein the configuration data includes parameters that regulate the transmission of the indication of the information and location by the mobile unit.

16. The system of claim 15, wherein the parameters regulate at least one of a location of the remote server and a frequency at which the collected data should be synchronized with the remote server.

17. The system of claim 1, wherein the mobile unit comprises:
a first memory to store first configuration data that is communicated from a remote source to the mobile unit; and
a second memory to store second configuration data local to the mobile unit for use if the source cannot be accessed to retrieve the first configuration data.

18. The system of claim 17, wherein if the remote source cannot be accessed by the mobile unit, the mobile unit uses the second configuration data to regulate the acquisition of the information and the transmission of the indication of the information and the location until the source can be accessed.

19. The system of claim 17, where the mobile unit compares the second configuration data with the first configuration data and if the first and second configurations are different, then mobile unit updates the second configuration data with the first configuration data.

20. The system of claim 17, wherein the mobile unit is adapted to receive a directive from the source to modify the first configuration data and the mobile unit modifies the first configuration data in response to third configuration data provided by the source.

21. The system in claim 1, wherein mobile unit is adapted to transmit the data automatically transferred pursuant to one of a pre-scheduled time, a timeout interval, or an amount of data that has been collected.

22. The system of claim 1, wherein the mobile unit is adapted to transmit the indication of the information and the location asynchronously after the acquisition of the information.

23. The system of claim 22, wherein the mobile unit is adapted to base the transmission on at least one of a set time schedule, a number of data sets collected, a condition of the network, or an amount of data collected.

24. The system of claim 1, wherein the mobile unit is adapted to attempt to establish connection with the server at regular intervals of time if a communication between the mobile unit and the server is disrupted, and the mobile unit transmit the information to the server when the server is available to communicate with the mobile unit.

25. The system of claim 1, wherein the mobile unit is adapted to resume a communication with the server is at a point where communication broke off should the communication be interrupted.

26. A system comprising:
mobile units, each mobile unit to:
acquire information about a different region near said each mobile unit other than a location of said each mobile unit,
determine the location of said each mobile unit,
automatically label the information near said each mobile unit with the location of said each mobile unit, and
transmit an indication of the information and location;
a client; and
at least one remote server coupled to the client to:
communicate with the mobile units to receive the indications from the mobile units; and
communicate at least some of the information to the client based on filtering parameters.

27. The system of claim 26, wherein
the client furnishes at least some of the filtering parameters to said at least one remote server.

28. The system of claim 26, wherein the filtering parameters comprise at least one of a mobile unit identifier, an acquisition time frame, a geographic location and moving information.

29. The system of claim 28, wherein the moving information comprises at least one of a direction and a speed.

30. The system of claim 26, further comprising:
a map server,
wherein the remote server uses the indications of locations from the mobile units to plot the locations on street maps that it obtains from the map server.

31. The system of claim 30, wherein the remote server presents at least one of the street maps to the client to permit the client to communicate a specific location to the remote server and the remote server communicates information from a mobile unit closest to the specific location to the client.

32. A method comprising:
using a mobile unit to acquire information about a region near the mobile unit other than a location of the mobile unit;
using the mobile unit to determine the location of the mobile unit;
automatically labeling the information with the location of the mobile unit;
communicating an indication of the information and location to a remote server; and
using the remote server to communicate at least some of the information to a client.

33. The method of claim 32, further comprising:
furnishing a request to the remote server for specific criteria; and
filtering the information based on the specific criteria before communicating the filtered information to the client.

34. The method of claim 33, wherein criteria comprises one selected from a set consisting essentially of a time, a date, a position and an identifier identifying the mobile unit.

35. The method of claim 32, wherein the communicating comprises:
acquiring the information automatically pursuant to a set schedule.

36. The method of claim 32, wherein the communicating comprises:
acquiring the information in response to a manual request.

37. The method of claim 32, wherein the information comprises one of a group consisting essentially of a pictures, a sounds, text, a weather condition, a brightness and a noise level.

38. A method of claim 32, wherein a size and quality of the indication of the information communicated to the remote server depends on parameters comprising at least one of a wireless channel quality, traffic conditions, wireless channel bit rate and a subscriber fee.

39. The method of claim 38, wherein the wireless channel quality is formed at least in part by at least one of a signal to noise ratio and a signal to interference ratio.

40. The method of claim 38, wherein the information comprises at least one of image data, audio data and video data.

41. A method usable with mobile units, comprising:
for each mobile unit, using the mobile unit to acquire information about a different region near the mobile unit other than a location of the mobile unit,
for each mobile unit, associating the location of the mobile unit with the information acquired by the mobile unit;
for each mobile unit, automatically labeling the information acquired by the mobile unit with the location of the mobile unit;
communicating indications of the information and the associated locations to a remote server;
filtering the information based on filtering parameters provided by a client; and
providing the filtered information to the client.

42. The method of claim 41, wherein
the client furnishes at least some of the filtering parameters to said at least one remote server.

43. The method of claim 41, wherein the filtering parameters comprise at least one of a mobile unit identifier, an acquisition time frame, a geographic location and moving information.

44. The method of claim 41, wherein the moving information comprises at least one of a direction and a speed.

45. The method of claim 41, further comprising:
displaying a street map; and
identifying a location on the street map to develop at least one of the filtering parameters.

46. The method of claim 45, further comprising:
displaying the mobile units on the street map, wherein the size of each mobile object that is displayed on the map depends on an accuracy of a location detection unit of said each mobile object.

47. The method of claim 46, wherein a size and a color of each mobile object that is displayed on the map depends on an age of information about said each mobile object.

48. The method of claim 45, wherein the location detection unit comprises:
a GPS receiver.

* * * * *